(12) United States Patent
Li

(10) Patent No.: US 10,445,545 B2
(45) Date of Patent: Oct. 15, 2019

(54) ELECTRONIC DEVICE WITH FINGERPRINT IDENTIFICATION FUNCTION AND FINGERPRINT IDENTIFICATION METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yong-Hai Li, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 190 days.

(21) Appl. No.: 15/607,415

(22) Filed: May 26, 2017

(65) Prior Publication Data

US 2017/0344786 A1    Nov. 30, 2017

(30) Foreign Application Priority Data

May 27, 2016    (CN) .......................... 2016 1 0368621

(51) Int. Cl.
| | |
|---|---|
| *G06K 9/00* | (2006.01) |
| *H04L 29/06* | (2006.01) |
| *G01K 7/16* | (2006.01) |
| *G06F 3/041* | (2006.01) |
| *G06F 21/32* | (2013.01) |
| *G01K 3/10* | (2006.01) |
| *G01K 13/00* | (2006.01) |

(52) U.S. Cl.
CPC .......... *G06K 9/00006* (2013.01); *G01K 3/10* (2013.01); *G01K 7/16* (2013.01); *G01K 13/002* (2013.01); *G06F 3/041* (2013.01); *G06F 21/32* (2013.01); *G06K 9/00087* (2013.01); *G06K 9/00107* (2013.01); *G06K 9/00335* (2013.01); *G06K 9/00892* (2013.01); *H04L 63/105* (2013.01)

(58) Field of Classification Search
None
See application file for complete search history.

(56) References Cited

U.S. PATENT DOCUMENTS

| 2005/0213799 A1* | 9/2005 | Sawano | ............... G06K 9/0002 382/124 |
|---|---|---|---|
| 2008/0166028 A1* | 7/2008 | Turek | ................... G06K 9/0002 382/124 |
| 2010/0113952 A1* | 5/2010 | Raguin | ................ G06K 9/0012 600/509 |

(Continued)

*Primary Examiner* — Saleh Najjar
*Assistant Examiner* — Michael W Chao
(74) *Attorney, Agent, or Firm* — ScienBiziP, P.C.

(57) ABSTRACT

A fingerprint identification method includes controlling a fingerprint acquiring device to receive fingerprint input by a touching operation from a user, and then determining whether certain fingerprint characteristics are also in evidence as predetermined conditions. User behavior characteristics as to finger pressure, pressing area, time spent in generating characteristic fingerprint, and finger temperature gradient are recorded and stored as parameters, and current user behavior characteristic are compared to the stored threshold characteristics. The user is verified when the current user fingerprint matches or equates to a threshold characteristic.

14 Claims, 2 Drawing Sheets

(56) References Cited

U.S. PATENT DOCUMENTS

| | | | |
|---|---|---|---|
| 2013/0104187 A1* | 4/2013 | Weidner | G06F 21/45 726/1 |
| 2013/0279769 A1* | 10/2013 | Benkley, III | G06K 9/00013 382/124 |
| 2013/0324089 A1* | 12/2013 | Kim | G06F 21/32 455/411 |
| 2014/0157401 A1* | 6/2014 | Alameh | G06F 21/45 726/17 |
| 2014/0201833 A1* | 7/2014 | Wang | G06F 21/36 726/19 |
| 2015/0067827 A1* | 3/2015 | Lim | G06F 21/32 726/19 |
| 2016/0182491 A1* | 6/2016 | Jia | H04L 63/08 726/1 |
| 2016/0232342 A1* | 8/2016 | Ganguly | G06F 21/36 |
| 2016/0246396 A1* | 8/2016 | Dickinson | G06F 3/03545 |
| 2017/0337362 A1* | 11/2017 | Arunachalam | H04L 63/0861 |

* cited by examiner

ELECTRONIC DEVICE WITH FINGERPRINT IDENTIFICATION FUNCTION AND FINGERPRINT IDENTIFICATION METHOD

CROSS-REFERENCE TO RELATED APPLICATIONS

This application claims priority to Chinese Patent Application No. 201610368621.4 filed on May 27, 2016, the contents of which are incorporated by reference herein.

FIELD

The subject matter herein generally relates to data security, and particularly to an electronic device with a fingerprint identification function and a fingerprint identification method.

BACKGROUND

Fingerprint identification technology is widely used in smart electronic devices, such as smart phones and personal computers. However, the fingerprint identification can be a long process, because many electronic devices lack processor performance.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
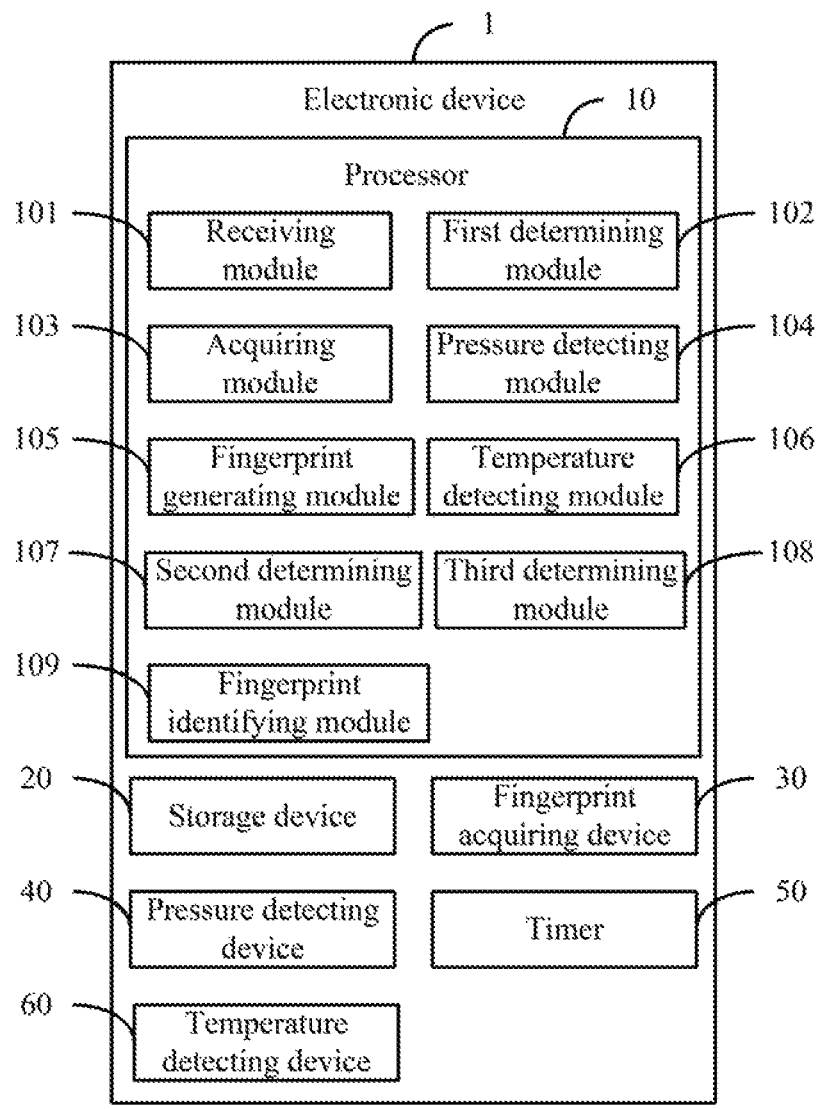
FIG. 1 is a block diagram of an exemplary embodiment of an electronic device with a fingerprint identification function.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an exemplary embodiment of an electronic device 1 with a fingerprint identification function. The electronic device 1 includes, but is not limited to, a processor 10, a storage device 20, and a fingerprint acquiring device 30. In at least one exemplary embodiment, the electronic device 1 can be a smart phone, a personal computer, or a PDA (Personal Digital Assistant). FIG. 1 illustrates only one example of the electronic device 1, other examples can include more or fewer components than as illustrated, or have a different configuration of the various components in other embodiments.

In at least one exemplary embodiment, the processor 10 can be a central processing unit (CPU), a microprocessor, or other data processor chip that performs functions of the electronic device 1.

In at least one exemplary embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium.

The storage device 20 is used for storing a threshold of at least one user behavior characteristic and a fingerprint database. In at least one exemplary embodiment, the at least one user behavior characteristic includes, but is not limited to, finger pressure, common pressing area on the fingerprint acquiring device 30, temperature gradient of a user finger, and time spent in generating a characteristic fingerprint. The fingerprint database includes fingerprints pre-input by a user.

In at least one exemplary embodiment, the fingerprint acquiring device 30 can be a fingerprint sensor. The fingerprint acquiring device 30 is used for receiving fingerprint by a touching operation from a user during fingerprint identification.

As illustrated in FIG. 1, the electronic device 1 includes a receiving module 101, a first determining module 102, an acquiring module 103, a pressure detecting module 104, a fingerprint generating module 105, a temperature detecting module 106, a second determining module 107, a third determining module 108, and a fingerprint identifying module 109. The modules 101-109 can be collections of software instructions stored in the storage device 20 of the electronic device 1 and executed by the processor 10. The modules 101-109 also can include functionality represented as hardware or integrated circuits, or as software and hardware combinations, such as a special-purpose processor or a general-purpose processor with special-purpose firmware.

The receiving module 101 is used to control the fingerprint acquiring device 30 to receive the fingerprint input by the touching operation from the user.

In at least one exemplary embodiment, the fingerprint acquiring device 30 is arranged on a casing of the electronic device 1, the user can input the fingerprint by performing the touching operation on the fingerprint acquiring device 30.

When the fingerprint acquiring device 30 receives the fingerprint, the first determining module 102 is used to determine whether a predetermined condition is met.

In at least one exemplary embodiment, the predetermined condition is that a time interval between a current time and the last time that the user inputs the fingerprint is shorter than a predetermined time interval. The first determining module 102 makes this determination. In at least one exemplary embodiment, the predetermined time interval between the current input and the last input can be one hour. In other exemplary embodiments, the predetermined time interval can be other value.

Optionally, the predetermined condition can also be that a currently-running application is a non-confidential application, that is, the first determining module 102 is used to determine whether the currently-running application is the non-confidential application. In at least one exemplary embodiment, the non-confidential application is a predetermined application that is not concerned with confidentiality, such as an unlocking application or a music application.

If the predetermined condition is met, the acquiring module 103 is used to acquire at least one user behavior characteristic when the user inputs the fingerprint. If the predetermined condition is not met, the fingerprint identifying module 109 is used to identify the fingerprint input by the user.

Optionally, the user behavior characteristic can be finger pressure generated by the touching operation. The electronic device 1 further includes a pressure detecting device 40. When the user inputs the fingerprint by the touching operation, the pressure detecting module 104 is used to control the pressure detecting device 40 to detect the pressure generated by the touching operation, the acquiring module 103 is used to acquire a maximum of the pressure detected by the pressure detecting device 40. In at least one exemplary embodiment, the pressure detecting device 40 can be a pressure sensor.

Optionally, the user behavior characteristic can be the time spent in generating the characteristic fingerprint. The electronic device 1 further includes a timer 40. When the user inputs the fingerprint by the touching operation, the fingerprint generating module 105 is used to generate a characteristic fingerprint of the user according to the fingerprint input by the user.

In detail, the fingerprint generating module 105 compares the fingerprint input by the user to the fingerprints pre-stored in the fingerprint database, analyzes and isolates repetitive fingerprint information, and generates the characteristic fingerprint by filtering the fingerprints. The acquiring module 103 acquires the time spent in generating the characteristic fingerprint, by the timer 50.

Optionally, the user behavior characteristic can be the common pressing area on the fingerprint acquiring device 30 when inputting the fingerprint. The acquiring module 103 determines the pressing area of the finger on the fingerprint acquiring device 30.

In detail, the input fingerprint is divided into a number of areas, and a predetermined number of characteristic points, uniformly distributed, are deemed to represent the complete fingerprint. The acquiring module 103 acquires a number of characteristic points when acquiring the fingerprint input by the user, determines a central point of the number of characteristic points, and determines the fingerprint area where the central point is located in, thus, the fingerprint area is taken as the common pressing area on the fingerprint acquiring device 30.

Optionally, the user behavior characteristic can be temperature gradient of the finger when inputting the fingerprint. The electronic device 1 further includes a temperature detecting device 60. When the user finger touches the fingerprint acquiring device 30, the temperature detecting module 106 is used to detect the temperature of the fingerprint acquiring device 30, the acquiring module 103 acquires a temperature change and rate of the temperature change of the fingerprint acquiring device 30 in a predetermined time period. In at least one exemplary embodiment, the temperature detecting device 40 can be a temperature sensor, the predetermined time period can be two seconds.

In at least one exemplary embodiment, the acquiring module 103 acquires one of the four user behavior characteristics described. The second determining module 107 is used to determine whether the acquired user behavior characteristic equates to or matches the threshold of the corresponding user behavior characteristic (threshold characteristic) stored in the storage device 20.

In detail, when the acquired user behavior characteristic is the finger pressure generated by the touching operation, the threshold finger pressure stored in the storage device 20 can be a predetermined pressure range. That is, the second determining module 107 determines whether the acquired maximum of the pressure is in the predetermined pressure range.

When the acquired user behavior characteristic is the time spent in generating the characteristic fingerprint, the threshold time spent in generating the characteristic fingerprint stored in the storage device 20 can be a predetermined time range. That is, the second determining module 107 determines whether the acquired time is in the predetermined time range.

When the acquired user behavior characteristic is the common pressing area on the fingerprint acquiring device 30, the threshold pressing area of the finger stored in the storage device 20 can be an area repetitiously used. That is, the second determining module 107 determines whether the acquired pressing area of the finger is the frequently-used pressing area.

When the acquired user behavior characteristic is the temperature gradient of the finger when inputting the fingerprint, the threshold temperature gradient stored in the storage device 20 can be a predetermined temperature gradient range. That is, the second determining module 107 determines whether the acquired temperature gradient is in the predetermined temperature gradient range.

When the second determining module 107 determines that the acquired user behavior characteristic equates to or matches the threshold characteristic stored in the storage device 20, the third determining module 108 determines that the user is a valid user.

When the second determining module 107 determines that the acquired user behavior characteristic does not equate to or match the threshold characteristic stored in the storage device 20, the fingerprint identifying module 109 identifies the fingerprint input by the user.

In at least one exemplary embodiment, the fingerprint indentifying module 109 identifies the input fingerprint by comparing the input fingerprint to the fingerprints pre-stored in the fingerprints database and determining whether the input fingerprint matches at least one pre-stored fingerprint. If the input fingerprint matches at least one pre-stored fingerprint, the fingerprint identifying module 109 determines that the input fingerprint is validated. If the input fingerprint does not match any pre-stored fingerprint, the fingerprint identifying module 109 determines that the input fingerprint is not validated.

In other exemplary embodiments, the acquiring module 103 acquires a number of user behavior characteristics of the four user behavior characteristics. The second determining module 107 determines whether the number of acquired user behavior characteristics equates to or match the threshold characteristic stored in the storage device 20. When the acquired user behavior characteristics do equate to or match the threshold characteristic, the third determining module 108 determines that the user is verified. When the acquired user behavior characteristics do not equate to or match any threshold characteristic stored in the storage device 20, the fingerprint identifying module 109 identifies the fingerprint input by the user.

When the fingerprint identifying module 109 determines that the input fingerprint is validated, the third determining module 108 determines that the user is a valid user. When the fingerprint identifying module 109 determines that the input fingerprint is not validated, the third determining module 108 determines that the user is not a valid user.

Figure 2:
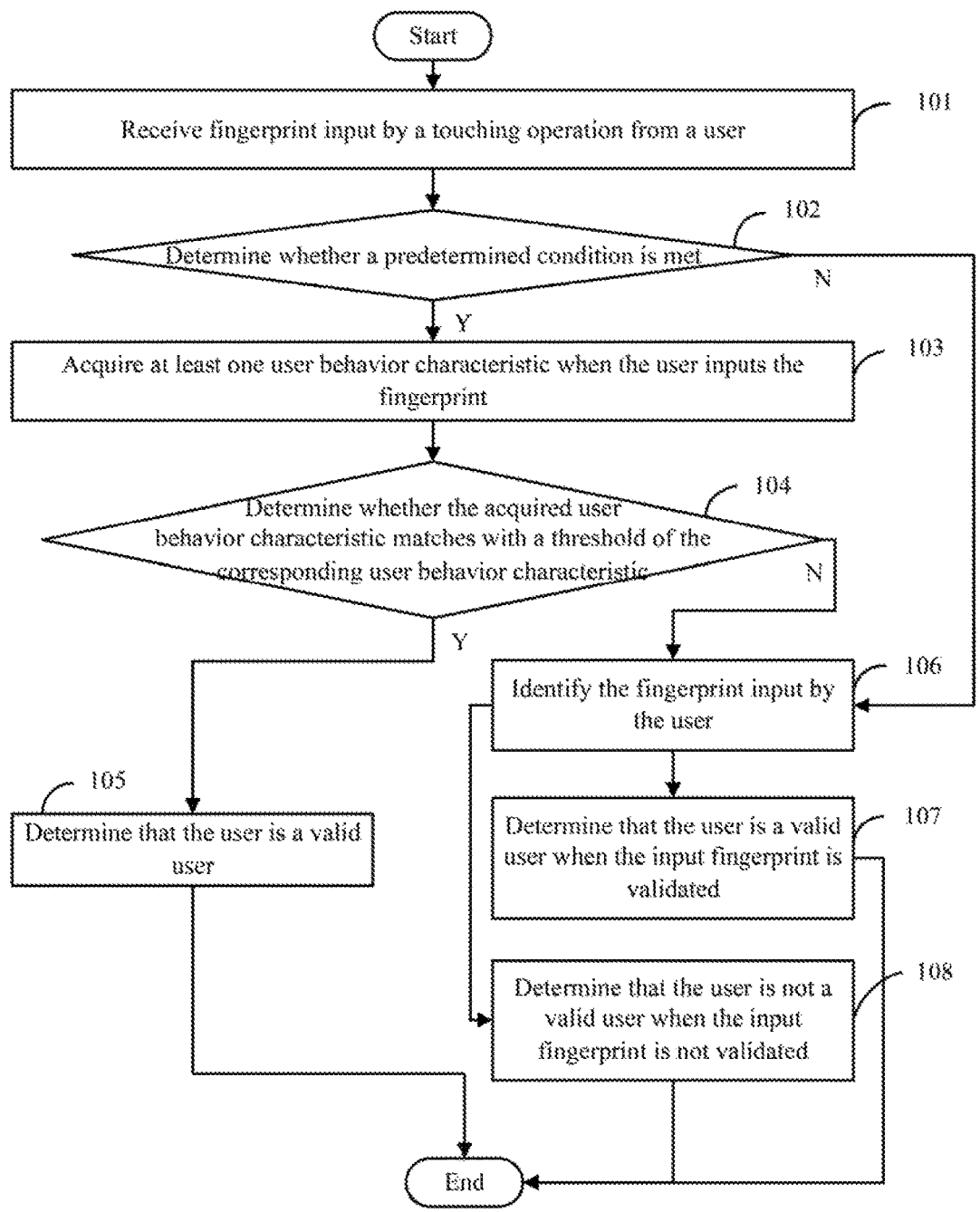
FIG. 2 illustrates a flowchart of an exemplary embodiment of a fingerprint identification method.

FIG. 2 illustrates a flowchart of an exemplary embodiment of a fingerprint identification method. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, a receiving module controls a fingerprint acquiring device to receive fingerprint input by a touching operation from a user.

At block 102, when the fingerprint acquiring device 30 receives the fingerprint, a first determining module determines whether a predetermined condition is met. If the predetermined condition is met, the process jumps to block 103. If the predetermined condition is not met, the process jumps to block 106.

At block 103, an acquiring module 103 acquires at least one user behavior characteristic when the user inputs the fingerprint.

At block 104, a second determining module determines whether the acquired user behavior characteristic matches a threshold of the corresponding user behavior characteristic stored in a storage device. If the acquired user behavior characteristic matches the threshold of the corresponding user behavior characteristic stored in the storage device 20, the process jumps to block 105. If the acquired user behavior characteristic does not match the threshold of the corresponding user behavior characteristic stored in the storage device 20, the process jumps to block 106.

At block 105, a third determining module determines that the user is a valid user.

At block 106, a fingerprint identifying module identifies the fingerprint input by the user.

At block 107, when the fingerprint identifying module determines that the input fingerprint is validated, the third determining module determines that the user is the valid user.

At block 108, when the fingerprint identifying module determines that the input fingerprint is not validated, the third determining module determines that the user is not the valid user.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device with a fingerprint identification function comprising:
   at least one processor;
   a fingerprint acquiring device electrically coupled to the at least one processor; and
   a storage device electrically coupled to the at least one processor and storing instructions for being executed by the at least one processor to cause the at least one processor to:
   control the fingerprint acquiring device to receive fingerprint input by a touching operation from a user;
   determine whether a predetermined condition is met;
   acquire, if the predetermined condition is met, at least one user behavior characteristic when the user inputs the fingerprint;
   determine, before identifying the fingerprint input by the user, whether the acquired user behavior characteristic matches a threshold of a corresponding user behavior characteristic stored in the storage device;
   determine, when determining that the acquired user behavior characteristic matches a threshold of a corresponding user behavior characteristic, that the user is a valid user
   identify, when determining that the acquired user behavior characteristic does not match the threshold of the corresponding user behavior characteristic, the fingerprint input by the user;
   determine, when the input fingerprint is validated, that the user is the valid user; and
   determine, when the input fingerprint is not validated, that the user is not the valid user.

2. The electronic device according to claim 1, wherein the predetermined condition is that a time interval between a current time and the last time that the user inputs the fingerprint is shorter than a predetermined time interval.

3. The electronic device according to claim 1, wherein the predetermined condition is that a currently-running application is a non-confidential application.

4. The electronic device according to claim 1, further comprising:
   a pressure detecting device electrically coupled to the at least one processor, wherein the at least one processor is further caused to:
   control, when the user inputs the fingerprint by the touching operation, the pressure detecting device to detect the pressure generated by the touching operation;
   acquire a maximum of the pressure detected by the pressure detecting device; and
   determine whether the acquired maximum of the pressure matches a threshold of the finger pressure stored in the storage device.

5. The electronic device according to claim 1, further comprising:
a timer electrically coupled to the at least one processor, wherein the at least one processor is further caused to:
generate a characteristic fingerprint of the user according to the fingerprint input by the user;
acquire the time spent in generating the characteristic fingerprint by the timer; and
determine whether the acquired time matches a threshold of the time spent in generating the characteristic fingerprint stored in the storage device.

6. The electronic device according to claim 1, wherein the at least one processor is further caused to:
determine a pressing area of the finger on the fingerprint acquiring device; and
determine whether the acquired pressing area of the finger matches a threshold of the pressing area of the finger stored in the storage device.

7. The electronic device according to claim 1, further comprising:
a temperature detecting device electrically coupled to the at least one processor, wherein the at least one processor is further caused to:
detect a temperature of the fingerprint acquiring device when the user finger touches the fingerprint acquiring device;
acquire a temperature change and rate of the temperature change of the fingerprint acquiring device in a predetermined time period; and
determine whether the acquired rate of the temperature change of the finger matches a threshold of the temperature gradient of the finger stored in the storage device.

8. A fingerprint identification method comprising:
controlling a fingerprint acquiring device to receive fingerprint input by a touching operation from a user;
determining whether a predetermined condition is met;
acquiring at least one user behavior characteristic when the user inputs the fingerprint if the predetermined condition is met;
determining, before identifying the fingerprint input by the user, whether the acquired user behavior characteristic matches a threshold of a corresponding user behavior characteristic stored in the storage device;
determining that the user is a valid user when determining that the acquired user behavior characteristic matches the threshold of a corresponding user behavior characteristic;
identifying the fingerprint input by the user when determining that the acquired user behavior characteristic does not match the threshold of the corresponding user behavior characteristic;
determining that the user is the valid user when the input fingerprint is validated; and
determining that the user is not the valid user when the input fingerprint is not validated.

9. The fingerprint identification method according to claim 8, wherein the predetermined condition is that a time interval between a current time and the last time that the user inputs the fingerprint is shorter than a predetermined time interval.

10. The fingerprint identification method according to claim 8, wherein the predetermined condition is that a currently-running application is a non-confidential application.

11. The fingerprint identification method according to claim 8, further comprising:
controlling a pressure detecting device to detect pressure generated by the touching operation when the user inputs the fingerprint by the touching operation;
acquiring a maximum of the pressure detected by the pressure detecting device; and
determining whether the acquired maximum of the pressure matches a threshold of the finger pressure stored in the storage device.

12. The fingerprint identification method according to claim 8, further comprising:
generating a characteristic fingerprint of the user according to the fingerprint input by the user;
acquiring the time spent in generating the characteristic fingerprint by a timer; and
determining whether the acquired time matches a threshold of the time spent in generating the characteristic fingerprint stored in the storage device.

13. The fingerprint identification method according to claim 8, further comprising:
determining a pressing area of the finger on the fingerprint acquiring device; and
determining whether the acquired pressing area of the finger matches a threshold of the pressing area of the finger stored in the storage device.

14. The fingerprint identification method according to claim 8, further comprising:
detecting a temperature of the fingerprint acquiring device when the user finger touches the fingerprint acquiring device;
acquiring a temperature change and rate of the temperature change of the fingerprint acquiring device in a predetermined time period; and
determining whether the acquired rate of the temperature change of the finger matches a threshold of the temperature gradient of the finger stored in the storage device.

* * * * *